Oct. 14, 1952     E. J. ANDERSON     2,613,631
APPARATUS FOR PROCESSING SURFACES OF CYLINDRICAL
ARTICLES AND THE LIKE
Filed Dec. 15, 1950     4 Sheets-Sheet 1
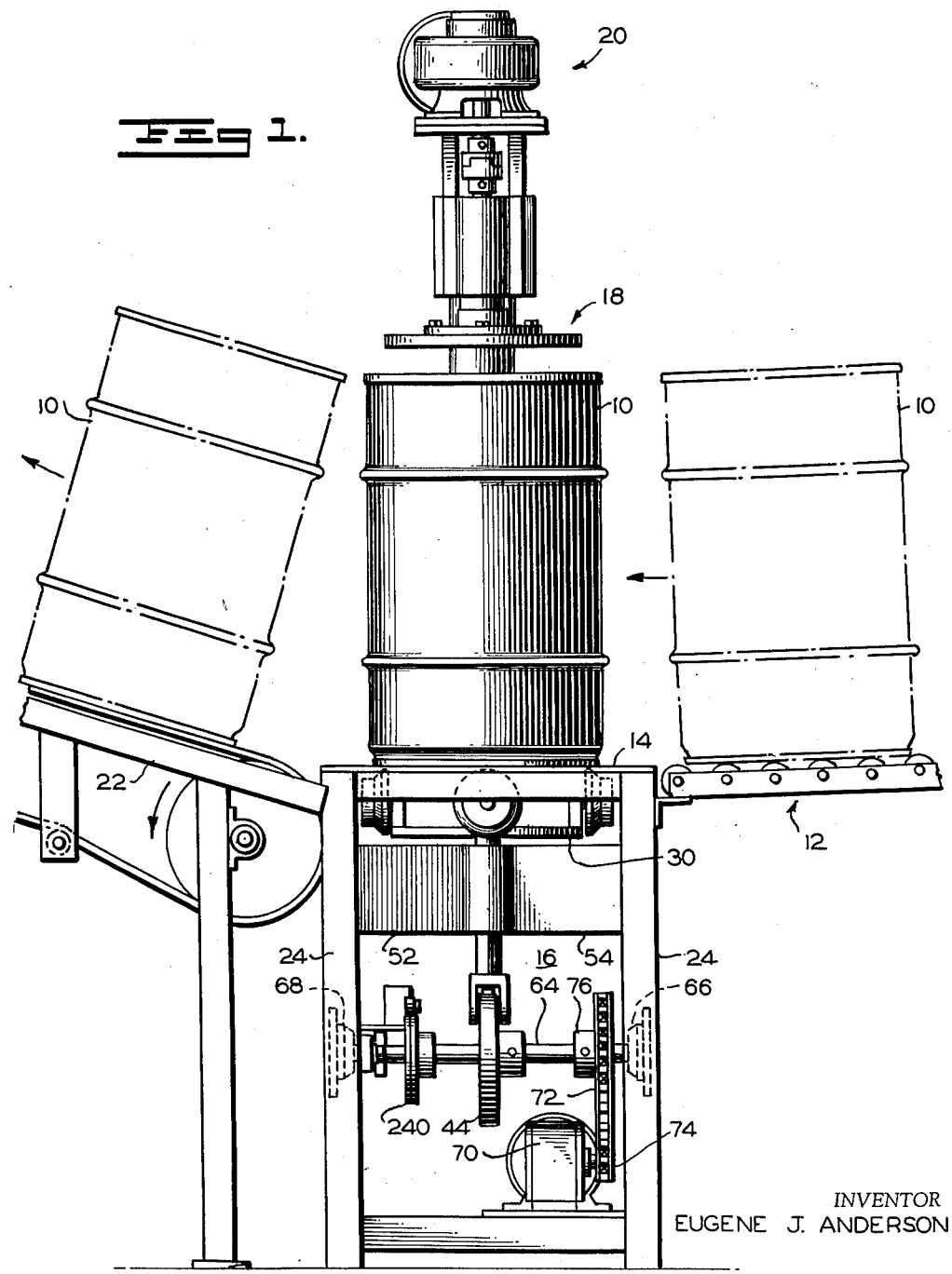
INVENTOR
EUGENE J. ANDERSON
BY Cushman, Darby & Cushman
ATTORNEY Oct. 14, 1952 E. J. ANDERSON 2,613,631
APPARATUS FOR PROCESSING SURFACES OF CYLINDRICAL
ARTICLES AND THE LIKE
Filed Dec. 15, 1950 4 Sheets-Sheet 2

INVENTOR
EUGENE J. ANDERSON

BY Cushman, Darby & Cushman
ATTORNEY

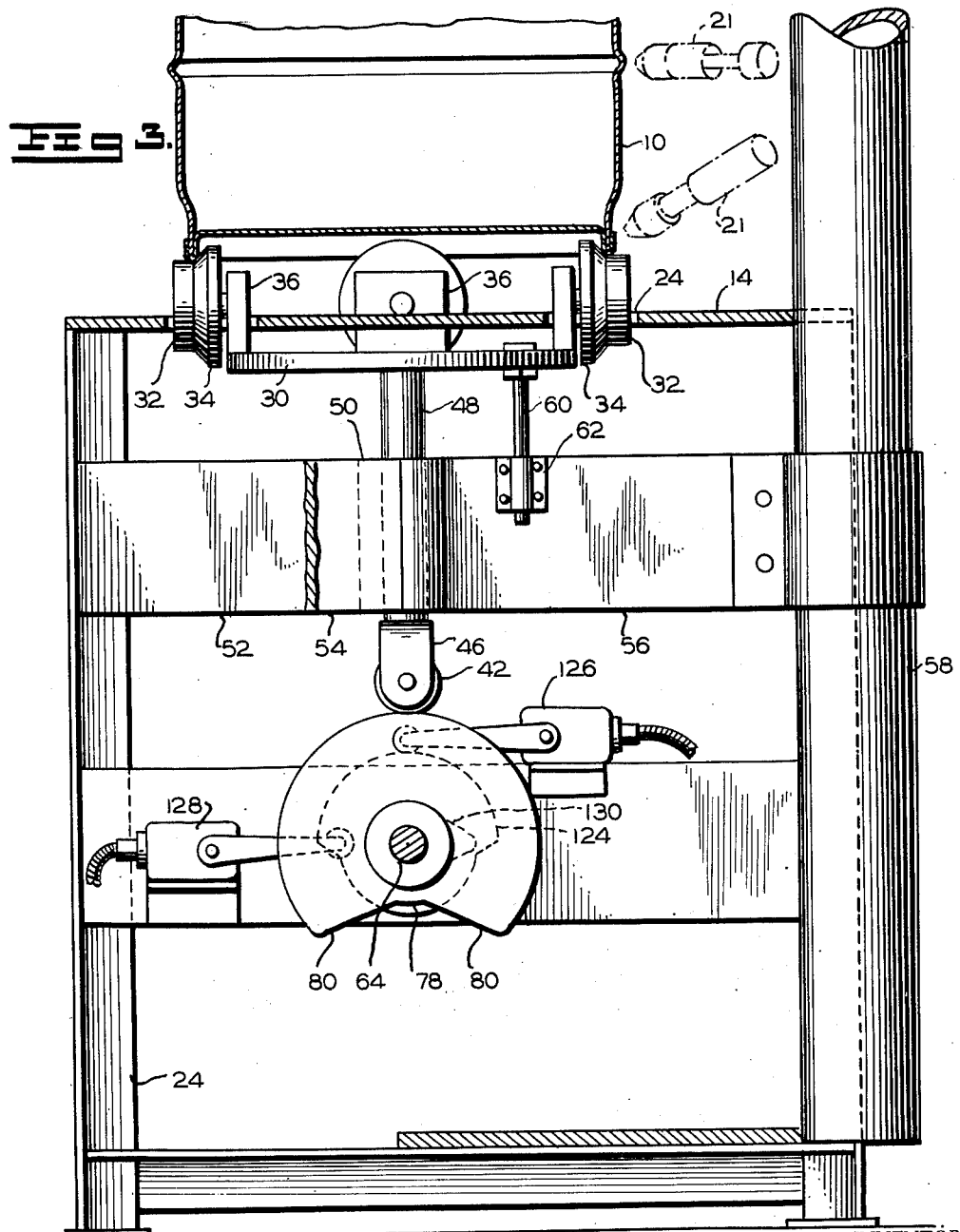

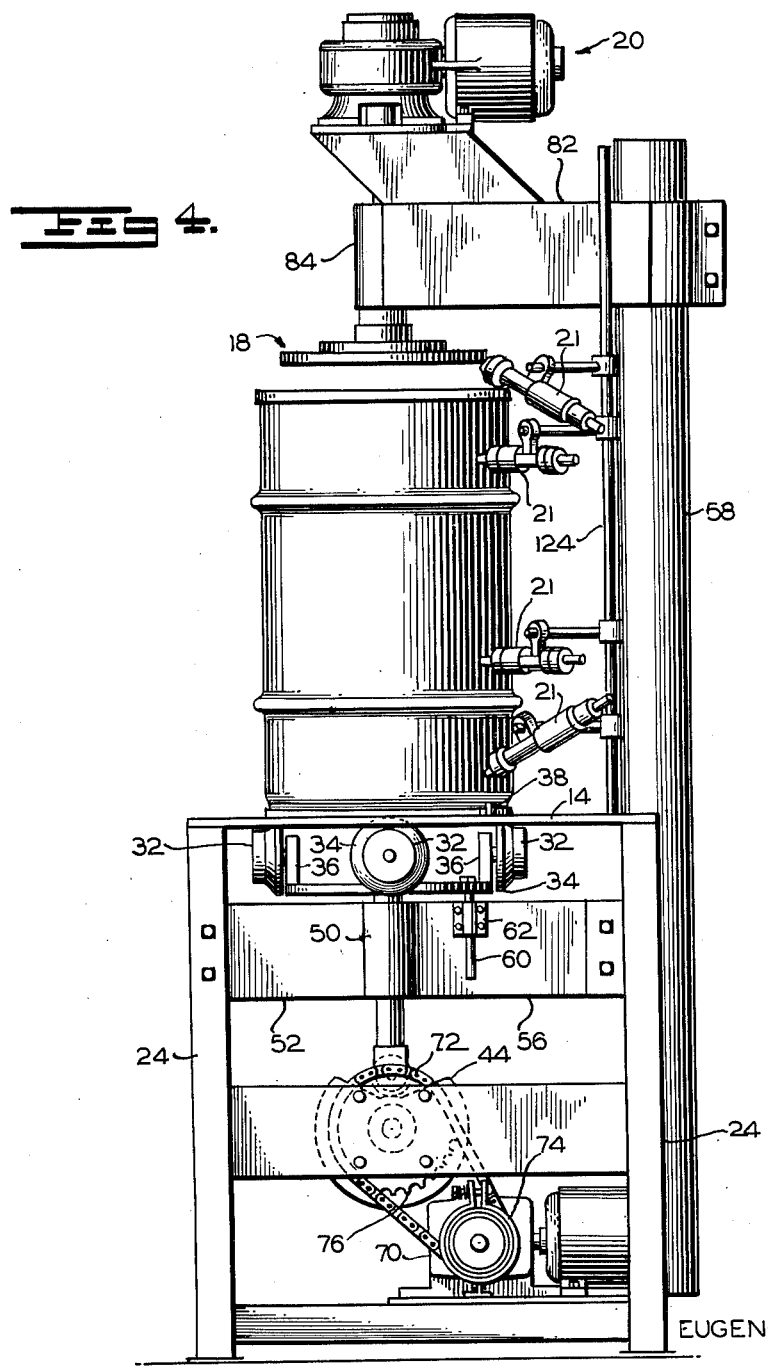

Patented Oct. 14, 1952

2,613,631

UNITED STATES PATENT OFFICE 2,613,631

APPARATUS FOR PROCESSING SURFACES OF CYLINDRICAL ARTICLES AND THE LIKE

Eugene J. Anderson, New Orleans, La., assignor to Rheem Manufacturing Company, Richmond, Calif., a corporation of California Application December 15, 1950, Serial No. 201,033

5 Claims. (Cl. 118—6)

1

This invention relates to an apparatus for processing the surfaces of cylindrical articles and the like, particularly in conjunction with conveyor line handling systems.

I will describe my invention in its application to the processing of containers and primarily with respect to the finishing and/or coating of peripheral surfaces of cylindrical steel drums, pails and the like. This mode of description will most readily lend the invention to a clear understanding and the many other objects which may be similarly processed will be immediately apparent.

By my invention, containers which are in general motion along a conveyor system may be readily lifted from the conveyor and engage with apparatus which rotates the containers about their axis for a time interval during which processing devices mounted adjacent the periphery of the containers perform processing operations.

It is a primary object of my invention to provide an apparatus for readily processing the surfaces of cylindrical objects.

It is a further object of my invention to provide means for readily removing cylindrical objects from a conveyor system and to cause them to be rotated about their longitudinal axis for processing operations upon the peripheral surfaces of the objects.

It is a further object of my invention to provide means for readily coating the upper and lower chimes of steel drums and applying a coating of wax to the beads of such drums.

The further objects and the entire scope of my invention will be further apparent from the following detailed description and from the appended claims. It will be understood that the detailed description is intended only for purposes of illustration and is not intended to limit the scope of my invention.

This application is related to the copending application of Stanley S. Johns, et al., Serial No. 187,572, filed September 29, 1950.

A complete understanding of my invention may be had with reference to the accompanying drawings in connection with the written description.

In the drawings:

Figure 1 is a front view of apparatus according to the invention;

Figure 3 is a view in partial section of a cam mechanism of my invention;

Figure 4 is a side view of the apparatus of Figure 1, and

2

Figure 5:
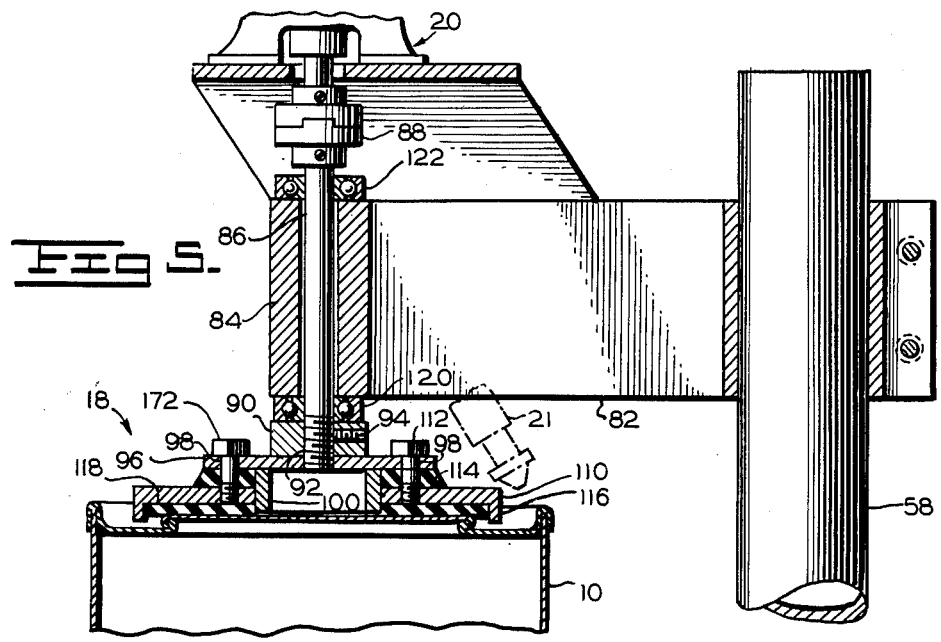

Figure 5 is a sectional view of a rotatable head which forms a part of my invention.

The general arrangement of my invention may be understood with reference to Figure 1. In this figure the containers are illustrated as steel drums designated by the reference numeral 10. As previously mentioned, many other types of objects may be processed by my invention, but for convenience drums will be illustrated and discussed. An infeed roll conveyor section designated generally as 12 is provided upon which drums to be processed are moved to the left as viewed in Figure 1. Each drum is moved to a central position upon a plate 14 and when in this position the drum is raised from the plate by means of a cam operated lifting unit designated generally as 16. When the drum has been raised a predetermined distance, the upper end of the drum becomes engaged with a rotatable head indicated generally as 18, and after the drum is in engagement with the head 18, this head is rotated by means of a motor unit indicated generally at 20. Due to a frictional engagement between the head 18 and the drum 10, the latter will be revolved, at which time a plurality of paint and/or wax spraying devices, indicated as 21, will be placed in operation to spray paint and/or wax on the chimes and beads of the drum. These processing devices are not shown in Figure 1, but will be fully described in connection with other figures in the drawing.

After the described processing operation has been completed, the cam operated lifting unit 16 will be operated to return the drum 10 to the plate 14, at which time the operator may slide the drum to the left (Figure 1) until it engages and is removed by a belt conveyor indicated generally as 22.

I will now describe my invention in greater detail, beginning with a complete description of the plate 14 and cam operated lifting device 16.

Figure 2:
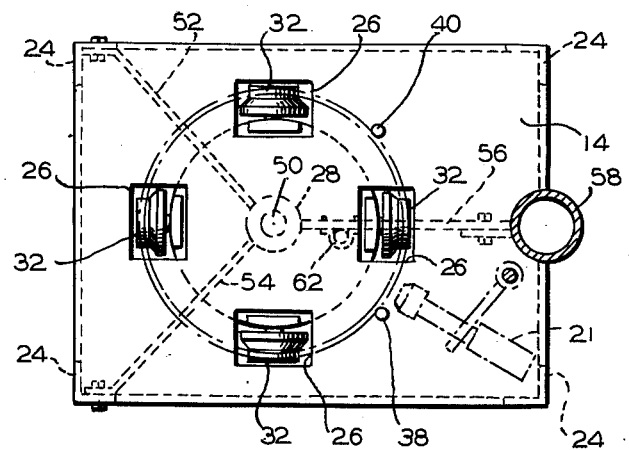
Figure 2 is a plan view in partial section of the apparatus of Figure 1.

Referring first to Figure 2, this is a plan view of the plate 14. This plate may be supported at a convenient height by means of four upstanding L-shaped leg members 24. The plate is provided with four rectangular apertures 26 which are located on the arc of a circle having a center point indicated as 28 which is directly beneath the center of the previously mentioned rotatable head member 18.

Beneath the plate 14 there is located a circular platform 30 upon which are mounted four rollers 32, each having a raised bead 34 at the inner edge thereof. These rollers are supported with their axes horizontal, by means of supporting posts 36 which extend upwardly from the circular platform 30. Referring to Figure 2, it will be observed that the rollers 32 are positioned in alignment with the rectangular apertures 26 in plate 14. Accordingly, if the platform 30 is moved in a vertical direction, the rollers 32 will move through the apertures 26 and the top of the rollers will extend a considerable distance above the plate 14. This position is illustrated in Figure 3.

From the structure as thus far described, it will be apparent that if a drum is positioned on the plate 14 with its vertical axis aligned with the axis of the rotatable head 18 and the previously mentioned center point 28, the raising of the platform 30 will result in the drum being supported upon the rollers 32, with the roller flanges 34 riding within the bottom chime of the drum. This condition is fully illustrated in Figure 3. Since the rollers 32 are free to revolve about their axes, the drum 10 may be freely rotated about its axis.

To properly locate the drum upon the plate 14 before raising the rollers 32, there are provided two studs 38 and 40 extending upwardly from the plate 14. These studs may be observed in Figures 2 and 3.

Referring primarily to Figure 3, the platform 30 is arranged to be elevated by means of a cam follower 42 which cooperates with a raising cam 44. The cam follower 42 is rotatably mounted on a yoke 46 and the yoke is connected to the platform 30 by means of a shaft 48. The shaft 48 is mounted for reciprocating motion in a bearing 50, which is supported by three fixed support arms 52, 54 and 56. The arms 52 and 54 extend outwardly diagonally to the forward pair of upstanding support members 24 and the arm 56 extends rearwardly and is clamped about a tubular column 58. The column 58 is fixedly attached to the framework, which supports the plate 14 and extends upwardly to also support the unit comprising rotatable head 18 and its driving motor 20.

The platform 30 may be prevented from rotating about the shaft 48 by means of a downwardly extending guide rod 60 mounted in the platform 30. A suitable bearing block 62 is mounted upon the support 56 to slidably receive the guide rod 60.

The elevating cam 44 is fixedly mounted upon a rotatable shaft 64, which extends in a horizonal direction between bearings 66 and 68 mounted on the framework of the table structure which supports plate 14. The shaft 64 is arranged to be rotated by means of a gear-motor unit 70 through a chain 72, which chain engages a sprocket 74 on the motor unit 70 and a sprocket 76 which is fixedly mounted on the shaft 64. The shaft 64 also carries control cams which will be described in detail below. The motor 70 may be equipped with a conventional type of brake to prevent overrunning if it is stopped.

The elevating cam 44 is circular over most of its periphery, but is cut away in one sector to provide a position in which the platform 30 may be in its lowermost or unoperated position. The drawings illustrate the preferred manner of shaping the cam 44 for efficient operation. As best shown in Figure 3, the cam proceeds from an innermost radius 78 to its full radius at either side of a fairly wide slope portion 80. By avoiding too sharp a rise, the power required on shaft 64 to raise the platform 30 is thus reduced.

Before proceeding with a description of control apparatus, the rotatable head 18 and motor drive 20 will be more fully described. As previously mentioned, these units are mounted upon the vertical tubular column 58. Clamped about the column is a horizontal supporting member 82. At the end of supporting member 82 there is located a bearing block 84 through which extends a rotatable shaft 86. The shaft 86 at its upper end is connected to a flexible driving joint 88 and at its lower end is connected to the previously mentioned rotatable head 18. The rotatable joint 88 is connected to the driving motor unit 20 by any suitable means.

Referring primarily to Figure 5, the rotatable head 18 is comprised of a hub 90 in which the shaft 86 is secured by the screw threads 92 and a set screw 94. A flange member 96 is attached to the hub 90 as by welding and a plurality of apertures 98 are provided about the periphery of this flange. An annular collar 100 is attached to the flange 96 as by welding, this collar being positioned to extend downwardly from the flange. A disc member 110 having a central aperture of sufficient diameter to fit over the collar 100 is attached to flange 96 by means of bolts 112 extending through the apertures 98 and a gasket 114 of yieldable material, such as rubber, is inserted between the flange 96 and the disc 110 in the manner shown in Figure 5. The disc 110 is provided with a depending edge 116 which extends a sufficient distance below the lower surface of disc 110 to permit the installation of a second gasket 118 of a yieldable material, such as rubber. This gasket may be affixed to the lower surface of disc 110 by any suitable cement. The collar 100 also extends a short distance below the lower surface of disc 110 to form an inner shoulder against which the edge of a central aperture in the gasket 118 may rest.

As best shown in Figure 5, when a drum 10 is raised into engagement with the head 18, the gasket 118 will frictionally engage the top surface of the drum and cause the latter to rotate with the head 18. It will, of course, be understood that the exact dimensions and other characteristics of the head 18 may be modified to accommodate any variety of container. However, in any instance, an arrangement of gaskets of yieldable material will reduce the shock of engagement between the container and the head and will also take into account any slight misalignments between the axis of rotation of the head 18 and the longitudinal axis of the container.

Suitable ball-type thrust bearings 120 and 122 may be provided, if desired, to take up the thrust and/or sidewise loading on the shaft 86.

The processing devices 21 may be mounted in any convenient fashion to be in the proper position when the drum is raised. As best shown in Figure 4, a vertical mounting shaft 124 may be provided, extending substantially parallel to the column 58. Each processing device may then be movably mounted on this shaft, as by set screws. The joint between the shaft 124 is preferably of a universal type, so that a paint spray or the like can be pointed in any direction. It will also be apparent that the inside surface of the chimes of the container may be coated. This may be accomplished by positioning an upper spray unit to operate between the disc 110 (Figure 5) and the chime, and at the bottom a spray may be mounted upon the platform 30 and project through an opening in the plate 14.

In the processing of steel drums, it is usually the custom to paint the upper and lower chimes, and to apply wax to the beads. A coating of wax on the beads decreases the wear thereon in subsequent handling operations.

The operation of the apparatus will now be described. Assuming the cam 44 to be in such position that the platform 30 is in its lowermost position, the operator will first move a drum onto the plate 14 and position it against the locating studs 38 and 40. With the drum in this position, the operator may then close a starting switch (not shown) which will complete a circuit to the motor unit 70. When this circuit is completed, the motor unit will start and the shaft 64 will rotate. After the cam 44 has rotated a sufficient distance to cause the cam follower 44 to ride upon the outermost portion of the cam, a control cam 124 will operate a limit switch 126 to complete a circuit to the motor unit 20, which drives the head 18. Accordingly, since the head 18 is now engaged with the drum 10, the latter will be rotated about its vertical axis. The limit switch 126 may also be employed to complete a circuit to solenoids (not shown) which place the processing devices in operation. After the shaft 64 has been rotated to a point where the cam follower 44 is about to again move into the cut-way portion of the cam 44, the control cam 124 will operate to break the circuit to the motor unit 20 and to the solenoids controlling the processing devices. The contour of cam 124 may be best understood with reference to Figure 3.

The shaft 64 is caused to rotate through only one revolution by means of a second limit switch 128, which cooperates with a starting cam 130, which is also fixedly mounted upon the shaft 64. When the apparatus is not operating, with the platform 30 in its lowermost position, the cam 130 will be in position to close the contacts of switch 128. The contacts of switch 128 and the contacts of the starting switch may be connected in parallel and, therefore, after the circuit to motor unit 70 is completed through the starting switch, this circuit will also be established through the switch 128 as soon as the shaft 64 is rotated a short distance. After switch 128 is closed, the starting switch may be opened, and the rotation of shaft 64 will continue until the cam 130 again opens the switch 128 at the completion of one revolution of the shaft 64. However, since the starting switch has been released, the circuit to motor unit 70 will be broken until the starting switch is again closed by the operator.

From the foregoing description it will be apparent that I provide apparatus which may be employed to rapidly process many varieties of cylindrical objects. The invention is of particular value in providing a means of processing the surfaces of cylindrical objects while they are in a vertical position. This means that the surfaces, once processed, will not be marred by having to be rolled away from the processing operation.

It will be understood that the foregoing description has been made only for purposes of illustration. The scope of the invention is to be determined from the appended claims.

I claim:

1. In apparatus for processing surfaces of cylindrical objects, a horizontal plate member adapted to support a cylindrical object in an upright position, roller means arranged to engage the lower end of the cylindrical object, means to elevate the roller means above the upper surface of the horizontal plate to raise the cylindrical object above the plate, a rotatable head member having its axis of rotation aligned with the axis of rotation of the cylindrical object as positioned on the roller means, the rotatable head means being positioned a predetermined distance above the horizontal plate whereby the cylindrical object in its elevated position will engage the head means, means to rotate the head means about its axis to rotate the cylindrical object, and processing devices so positioned to be adjacent the periphery of the cylindrical object in the elevated position of the latter whereby at least portions of the cylindrical surface may be processed as the object is rotated.

2. Apparatus as in claim 1 in which the processing devices comprise fluid spray units.

3. Apparatus as in claim 1 in which the roller elevating means comprises a rotatable cam means.

4. Apparatus as in claim 3 and further including, a motor unit adapted to drive the rotatable cam means, a control cam mounted to rotate with the elevating cam, and means operated by the control cam for energizing the means to rotate the head means and to operate the processing devices only when the cylindrical object is in its elevated position.

5. Apparatus as in claim 4 and further including, a starting cam, and means operated by the starting cam and connected in parallel circuit arrangement with the means operated by the control cam means for providing single revolutions of the elevating cam.

EUGENE J. ANDERSON.

REFERENCES CITED

The following references are of record in the file of this patent:

UNITED STATES PATENTS

| Number | Name | Date |
|---|---|---|
| 966,507 | Wright | Aug. 9, 1910 |
| 1,700,697 | Droper | Jan. 29, 1929 |
| 2,074,432 | Rollings | Mar. 23, 1937 |
| 2,350,569 | Reynolds | June 6, 1944 |
| 2,442,179 | Shanklin et al. | May 25, 1948 |
| 2,519,177 | Chenault | Aug. 15, 1950 |